US011254827B2

(12) United States Patent
Koduma

(10) Patent No.: US 11,254,827 B2
(45) Date of Patent: Feb. 22, 2022

(54) SILVER PARTICLE COATING COMPOSITION

(71) Applicant: Daicel Corporation, Osaka (JP)

(72) Inventor: Hiroyoshi Koduma, Himeji (JP)

(73) Assignee: DAICEL CORPORATION, Osaka (JP)

( * ) Notice: Subject to any disclaimer, the term of this patent is extended or adjusted under 35 U.S.C. 154(b) by 4 days.

(21) Appl. No.: 15/551,852

(22) PCT Filed: Dec. 22, 2015

(86) PCT No.: PCT/JP2015/085891
§ 371 (c)(1),
(2) Date: Aug. 17, 2017

(87) PCT Pub. No.: WO2016/132649
PCT Pub. Date: Aug. 25, 2016

(65) Prior Publication Data
US 2018/0066148 A1 Mar. 8, 2018

(30) Foreign Application Priority Data

Feb. 19, 2015 (JP) .............................. JP2015-030673

(51) Int. Cl.
C09D 11/033 (2014.01)
B22F 9/30 (2006.01)
C09D 1/00 (2006.01)
C09D 5/24 (2006.01)
C09D 11/52 (2014.01)
H01B 1/22 (2006.01)
H01B 13/00 (2006.01)
H01B 1/02 (2006.01)
C09D 11/037 (2014.01)
B22F 1/00 (2022.01)

(52) U.S. Cl.
CPC .......... C09D 11/033 (2013.01); B22F 1/0062 (2013.01); B22F 9/30 (2013.01); C09D 1/00 (2013.01); C09D 5/24 (2013.01); C09D 11/037 (2013.01); C09D 11/52 (2013.01); H01B 1/02 (2013.01); H01B 1/22 (2013.01); H01B 13/00 (2013.01); H01B 13/0036 (2013.01); B22F 2301/255 (2013.01)

(58) Field of Classification Search
CPC ........ C09D 11/033; C09D 1/00; C09D 11/52; C09D 5/24; C09D 11/037; B22F 9/30; B22F 1/0062; B22F 2301/255; H01L 31/22; H01L 31/02; H01B 1/22; H01B 13/0036; H01B 13/00; H01B 1/02
See application file for complete search history.

(56) References Cited

U.S. PATENT DOCUMENTS

| | | | |
|---|---|---|---|
| 2012/0043510 A1 | 2/2012 | Kurihara et al. | |
| 2013/0270488 A1 | 10/2013 | Ueyama et al. | |
| 2013/0334470 A1 | 12/2013 | Kurihara et al. | |
| 2014/0326929 A1 | 11/2014 | Hsueh et al. | |
| 2014/0346412 A1 | 11/2014 | Okamoto et al. | |
| 2015/0001452 A1* | 1/2015 | Kurihara | C09D 11/52 252/514 |
| 2015/0115018 A1 | 4/2015 | Hori et al. | |
| 2015/0217375 A1 | 8/2015 | Iguchi et al. | |
| 2015/0224578 A1 | 8/2015 | Okamoto et al. | |
| 2015/0225588 A1 | 8/2015 | Iguchi et al. | |
| 2016/0185990 A1* | 6/2016 | Cho | C09D 11/52 252/514 |
| 2017/0043396 A1 | 2/2017 | Koduma | |

FOREIGN PATENT DOCUMENTS

| | | |
|---|---|---|
| CN | 103328135 A | 9/2013 |
| EP | 3 202 859 A1 | 8/2017 |
| JP | 2008-176951 A | 7/2008 |
| JP | 2008-214695 A | 9/2008 |
| JP | 2010-55807 A | 3/2010 |
| JP | 2010-90211 A | 4/2010 |
| JP | 2010-265543 A | 11/2010 |
| JP | 2011-37999 A | 2/2011 |
| JP | 2011-236453 A | 11/2011 |
| JP | 2012-38615 A | 2/2012 |
| JP | 2012038614 * | 2/2012 |
| JP | 2012-162767 A | 8/2012 |
| JP | 2013-37773 A | 2/2013 |

(Continued)

OTHER PUBLICATIONS

Machine translation JP2013-036057 (Year: 2013).*

(Continued)

Primary Examiner — Samir Shah
(74) Attorney, Agent, or Firm — Birch, Stewart, Kolasch & Birch, LLP

(57) ABSTRACT

The present invention provides a silver coating composition that develops excellent conductivity (low resistance value) by low-temperature and short-time calcining and that has excellent printability. A silver particle coating composition including: silver nano-particles whose surfaces are coated with a protective agent including an aliphatic hydrocarbon amine; and a dispersion solvent, wherein the dispersion solvent includes a solvent selected from the group consisting of a glycol ether-based solvent and a glycol ester-based solvent. The silver particle coating composition is suitable for various printing methods such as intaglio offset printing and screen printing.

9 Claims, No Drawings

(56) References Cited

FOREIGN PATENT DOCUMENTS

| | | | |
|---|---|---|---|
| JP | 2013036057 | * | 2/2013 |
| JP | 2013-142172 A | | 7/2013 |
| JP | 2013-142173 A | | 7/2013 |
| JP | 2014-220238 A | | 11/2014 |
| WO | WO 2013/105530 A1 | | 7/2013 |
| WO | WO 2013/105531 A1 | | 7/2013 |
| WO | WO 2014/021270 A1 | | 2/2014 |
| WO | WO 2014/024721 A1 | | 2/2014 |
| WO | WO 2014/024901 A1 | | 2/2014 |
| WO | WO 2014/069074 A1 | | 5/2014 |
| WO | WO 2015/151941 A1 | | 10/2015 |
| WO | WO 2015/163076 A1 | | 10/2015 |

OTHER PUBLICATIONS

Machine translation of JP 2012038614 (Year: 2012).*
International Preliminary Report on Patentability and Written Opinion of the International Searching Authority (Forms PCT/IB/338, PCT/IB/326, PCT/IB/373 and PCT/ISA/237), dated Aug. 31, 2017, for International Application No. PCT/JP2015/085891, with an English translation of the Written Opinion.
Machine translation of JP-2008-176951-A published on Jul. 31, 2008.
Machine translation of JP-2008-214695-A published on Sep. 18, 2008.
Machine translation of JP-2011-236453-A published on Nov. 24, 2011.
Machine translation of JP-2013-37773-A published on Feb. 21, 2013.
International Search Report issued in PCT/JP2015/085891 (PCT/ISA/210), dated Feb. 16, 2016.
Written Opinion of the International Searching Authority issued in PCT/JP2015/085891 (PCT/ISA/237), dated Feb. 16, 2016.
Extended European Search Report dated Oct. 1, 2018, in European Patent Application No. 15882750.1.
Japanese Notification of Reasons for Refusal, dated Jul. 30, 2019, for Japanese Application No. 2017-500303.
Chinese Office Action and Search Report for Chinese Application No. 201580076424.9, dated Sep. 12, 2019.

* cited by examiner

# SILVER PARTICLE COATING COMPOSITION

TECHNICAL FIELD

The present invention relates to a silver particle-containing coating composition and a method for producing the same. The silver particle coating composition according to the present invention is suitable for intaglio offset printing such as gravure offset printing or curved surface printing, or screen printing. The present invention is applied also to a metal particle-containing coating composition containing a metal other than silver and a method for producing the same.

BACKGROUND ART

Silver nano-particles can be sintered even at a low temperature. Utilizing this property, a silver coating composition containing silver nano-particles is used to form electrodes or conductive circuit patterns on a substrate in production of various electronic devices. Silver nano-particles are usually dispersed in an organic solvent. Silver nano-particles have an average primary particle diameter of about several nanometers to about several tens of nanometers, and their surfaces are usually coated with an organic stabilizer (protective agent). When the substrate is a plastic film or sheet, silver nano-particles need to be sintered at a low temperature (e.g., at 200° C. or less) less than a heat resistant temperature of the plastic substrate.

Particularly, attempts have been recently made to form fine metal lines (e.g., silver lines) not only on heat-resistant polyimide substrates that are already in use as substrates for flexible printed circuit boards but also on substrates made of various plastics, such as PET (polyethylene terephthalate) and polypropylene, that have lower heat resistance than polyimide but can be easily processed and are cheap. When plastic substrates having low heat resistance are used, metal nano-particles (e.g., silver nano-particles) need to be sintered at a lower temperature.

For example, JP-A-2008-214695 discloses a method for producing silver ultrafine particles, comprising: reacting silver oxalate and oleylamine to form a complex compound containing at least silver, oleylamine, and an oxalate ion; and thermally decomposing the formed complex compound to form silver ultrafine particles (claim 1). Further, JP-A-2008-214695 discloses that in the above method, a saturated aliphatic amine having 1 to 18 carbon atoms in total is reacted in addition to the silver oxalate and the oleylamine (claims 2 and 3), so that a complex compound can be easily formed, the time required to produce silver ultrafine particles can be reduced, and the silver ultrafine particles protected by these amines can be formed in higher yield (paragraph [0011]). The silver ultrafine particles are washed and separated with methanol (paragraphs [0019] and [0023]).

JP-A-2010-265543 discloses a method for producing coated silver ultrafine particles, comprising the first step of mixing a silver compound that is decomposed by heating to generate metallic silver, a mid- to short-chain alkylamine having a boiling point of 100° C. to 250° C., and a mid- to short-chain alkyldiamine having a boiling point of 100° C. to 250° C. to prepare a complex compound containing the silver compound, the alkylamine, and the alkyldiamine; and the second step of thermally decomposing the complex compound (claim 3, paragraphs [0061] and [0062]). The silver ultrafine particles are washed and separated with methanol (paragraphs [0068] and [0072]).

JP-A-2012-162767 discloses a manufacturing method of coated metal fine particles, comprising the first step of mixing an amine liquid mixture of an alkylamine having 6 or more carbon atoms and an alkylamine having 5 or less carbon atoms with a metal compound including a metal atom, thereby generating a complex compound including the metal compound and amines; and the second step of heating and decomposing the complex compound, thereby generating metal fine particles (claim 1). JP-A-2012-162767 also discloses that coated silver fine particles can be dispersed in an organic solvent, such as an alcohol solvent such as butanol, a non-polar solvent such as octane, or a solvent mixture thereof (paragraph [0079]). The silver fine particles are washed and separated with methanol (paragraph [0095]).

JP-A-2013-142172 and WO 2013/105530 disclose a method for producing silver nano-particles, comprising:
preparing an amine mixture liquid comprising:
an aliphatic hydrocarbon monoamine (A) comprising an aliphatic hydrocarbon group and one amino group, said aliphatic hydrocarbon group having 6 or more carbon atoms in total;
an aliphatic hydrocarbon monoamine (B) comprising an aliphatic hydrocarbon group and one amino group, said aliphatic hydrocarbon group having 5 or less carbon atoms in total; and
an aliphatic hydrocarbon diamine (C) comprising an aliphatic hydrocarbon group and two amino groups, said aliphatic hydrocarbon group having 8 or less carbon atoms in total;
mixing a silver compound and the amine mixture liquid to form a complex compound comprising the silver compound and the amines; and
thermally decomposing the complex compound by heating to form silver nano-particles (claim 1). The silver nano-particles are washed and separated with methanol (paragraphs [0083] and [0102]). JP-A-2013-142172 and WO 2013/105530 also disclose that a silver coating composition called "silver ink" can be prepared by dispersing the obtained silver nano-particles in suspension state in an appropriate organic solvent (dispersion medium). JP-A-2013-142172 and WO 2013/105530 disclose, as the organic solvent, aliphatic hydrocarbon solvents such as pentane, hexane, heptane, octane, nonane, decane, undecane, dodecane, tridecane, and tetradecane; aromatic hydrocarbon solvents such as toluene, xylene, and mesitylene; and alcohol solvents such as methanol, ethanol, propanol, n-butanol, n-pentanol, n-hexanol, n-heptanol, n-octanol, n-nonanol, and n-decanol (paragraph [0085]).

JP-A-2013-142173 and WO 2013/105531 disclose a method for producing silver nano-particles, comprising:
preparing an amine mixture liquid comprising:
an aliphatic hydrocarbon monoamine (A) comprising an aliphatic hydrocarbon group and one amino group, said aliphatic hydrocarbon group having 6 or more carbon atoms in total; and
an aliphatic hydrocarbon monoamine (B) comprising an aliphatic hydrocarbon group and one amino group, said aliphatic hydrocarbon group having 5 or less carbon atoms in total, in a specific ratio;
mixing a silver compound and the amine mixture liquid to form a complex compound comprising the silver compound and the amines; and
thermally decomposing the complex compound by heating to form silver nano-particles (claim 1). The silver nano-particles are washed and separated with methanol (paragraphs [0074] and [0092]). In the same way as JP-A-2013-142172, JP-A-2013-142173 and WO 2013/105531 also disclose that a silver coating composition called "silver ink" can be prepared by dispersing the obtained silver nano-particles in suspension state in an appropriate organic solvent (dispersion medium), and disclose the same organic solvents as in JP-A-2013-142172 (paragraph [0076]).

WO 2014/021270 discloses a method for producing silver nanoparticle-containing ink, comprising:

mixing a silver compound with an amine mixture comprising an aliphatic hydrocarbon monoamine (A) comprising an aliphatic hydrocarbon group and one amino group, said aliphatic hydrocarbon group having 6 or more carbon atoms in total; and further comprising at least one of an aliphatic hydrocarbon monoamine (B) comprising an aliphatic hydrocarbon group and one amino group, said aliphatic hydrocarbon group having 5 or less carbon atoms in total; and an aliphatic hydrocarbon diamine (C) comprising an aliphatic hydrocarbon group and two amino groups, said aliphatic hydrocarbon group having 8 or less carbon atoms in total; to form a complex compound comprising the silver compound and the amines;

thermally decomposing the complex compound by heating to form silver nano-particles; and dispersing the silver nano-particles in a dispersion solvent containing an alicyclic hydrocarbon (claim 1). The silver nano-particles are washed and separated with methanol (paragraphs [0099] and [0134]).

WO 2014/024721 discloses a method for producing silver nano-particles, comprising:

mixing a silver compound with an aliphatic amine comprising at least a branched aliphatic hydrocarbon monoamine (D) comprising a branched aliphatic hydrocarbon group and one amino group, said branched aliphatic hydrocarbon group having 4 or more carbon atoms, to form a complex compound comprising the silver compound and the amine; and thermally decomposing the complex compound by heating to form silver nano-particles (claim 1). The silver nano-particles are washed and separated with methanol and/or butanol (paragraphs [0095] and [0114]).

WO 2014/024901 discloses a method for producing silver nano-particles, comprising: mixing an aliphatic hydrocarbon amine and a silver compound in the presence of an alcohol solvent having 3 or more carbon atoms to form a complex compound comprising the silver compound and the amine; and thermally decomposing the complex compound by heating to form silver nano-particles (claim 1). The silver nano-particles are washed and separated with methanol or butanol (pages 42 and 50).

JP-A-2010-55807, JP-A-2010-90211, JP-A-2011-37999, and JP-A-2012-38615 disclose the use of a conducive silver paste or ink for intaglio offset printing. However, none of these patent documents disclose silver nano-particles whose surfaces are coated with a protective agent containing an aliphatic hydrocarbon amine. Further, none of these patent documents disclose that satisfactory conductive performance can be achieved by low-temperature calcining.

PRIOR ART DOCUMENT

Patent Documents

Patent Document 1: JP-A-2008-214695
Patent Document 2: JP-A-2010-265543
Patent Document 3: JP-A-2012-162767
Patent Document 4: JP-A-2013-142172
Patent Document 5: WO 2013/105530
Patent Document 6: JP-A-2013-142173
Patent Document 7: WO 2013/105531
Patent Document 8: WO 2014/021270
Patent Document 9: WO 2014/024721
Patent Document 10: WO 2014/024901
Patent Document 11: JP-A-2010-55807
Patent Document 12: JP-A-2010-90211
Patent Document 13: JP-A-2011-37999
Patent Document 14: JP-A-2012-38615

SUMMARY OF THE INVENTION

Problems to be Solved by the Invention

Silver nano-particles have an average primary particle diameter of about several nanometers to about several tens of nanometers, and are more likely to agglomerate than micron ($\mu$m)-size particles. Therefore, the reduction reaction of a silver compound (thermal decomposition reaction in the above Patent Documents 1 to 10) is performed in the presence of an organic stabilizer (protective agent such as an aliphatic amine or an aliphatic carboxylic acid) so that the surfaces of resulting silver nano-particles are coated with the organic stabilizer.

Meanwhile, silver nano-particles are used in a silver coating composition (silver ink or silver paste) in which the particles are contained in an organic solvent. In order to develop conductivity, an organic stabilizer coating the silver nano-particles needs to be removed during calcining, performed after application of the silver coating composition onto a substrate, to sinter the silver particles. When the temperature of the calcining is low, the organic stabilizer is poorly removed. When the silver particles are not sufficiently sintered, a low resistance value cannot be achieved. That is, the organic stabilizer present on the surfaces of the silver nano-particles contributes to the stabilization of the silver nano-particles, but on the other hand, interferes with the sintering of the silver nano-particles (especially, sintering by low-temperature calcining).

The use of an aliphatic amine compound and/or an aliphatic carboxylic acid compound each having a relatively long chain (e.g., 8 or more carbon atoms) as an organic stabilizer makes it easy to stabilize silver nano-particles because it is easy to provide space between the silver nano-particles. On the other hand, the long-chain aliphatic amine compound and/or the long-chain aliphatic carboxylic acid compound are/is poorly removed when the temperature of calcining is low.

As described above, the relationship between the stabilization of silver nano-particles and the development of a low resistance value by low-temperature calcining is a trade-off.

The above Patent Documents 11 to 14 do not disclose silver nano-particles whose surfaces are coated with a protective agent containing an aliphatic hydrocarbon amine, and do not disclose the matter that satisfactory conductive performance is achieved by low-temperature calcining, either.

It is therefore an object of the present invention to provide a silver particle coating composition that develops excellent conductivity (low resistance value) by low-temperature and short-time calcining.

Meanwhile, when a silver particle coating composition (ink) is used for screen printing, the ink needs to be transferred onto a base material, on which the ink is to be printed, by pushing the ink with a squeegee through a screen printing plate. At this time, the ink is pushed through the screen printing plate toward the base material side, but part of the ink remains in the screen printing plate in this process.

If the remaining ink contains a highly volatile solvent, the ink is thickened or dried and solidified by volatilization of the solvent. Such thickening or drying and solidification of the ink cause clogging of the screen printing plate, which as a result has a serious adverse effect on continuous printing.

Further, also when the silver particle coating composition is used for intaglio offset printing, a similar problem is caused. In intaglio offset printing, recesses of an intaglio plate are first filled with the silver coating composition, the silver coating composition filled in the recesses is transferred to allow a blanket to receive the silver coating composition, and then the silver coating composition is transferred from the blanket to a substrate on which the silver coating composition should be printed. If the silver coating composition contains a highly volatile solvent, there is a fear that the silver coating composition is dried and solidified in the recesses of the intaglio plate by volatilization of the solvent during continuous printing.

Also in a printing method other than screen printing or intaglio offset printing, if the solvent of the coating composition evaporates, the concentration of the composition changes so that printability is reduced.

In the above Patent Documents 1 to 10, silver nano-particles obtained by a thermal decomposition reaction are washed and separated with a low-boiling-point solvent that is easily volatilized, such as methanol or butanol. The solvent used for washing and separation is contained in the silver coating composition as part of a dispersion solvent. Therefore, it is considered that evaporation of the solvent for washing and separation needs to be suppressed to improve printability. In recent years, conductive lines need to be finer due to a reduction in size and an increase in density of elements in an electronic device. Therefore, it is important to improve printability to perform desired patterning even when continuous printing is performed by any printing method.

It is therefore an object of the present invention to provide a silver coating composition that develops excellent conductivity (low resistance value) by low-temperature and short-time calcining and that has excellent printability.

Means for Solving the Problems

The present inventor has completed the present invention by using a solvent selected from a glycol ether-based solvent and a glycol ester-based solvent to wash and separate silver nano-particles which are prepared by a so-called thermal decomposition method and whose surfaces are coated with a protective agent containing an aliphatic hydrocarbon amine. The present invention includes the following aspects.

(1) A silver particle coating composition comprising:
silver nano-particles whose surfaces are coated with a protective agent comprising an aliphatic hydrocarbon amine; and
a dispersion solvent,
wherein the dispersion solvent comprises a solvent selected from the group consisting of a glycol ether-based solvent and a glycol ester-based solvent.

(2) The silver particle coating composition according to the above (1), wherein
the aliphatic hydrocarbon amine in the silver nano-particle comprises an aliphatic hydrocarbon monoamine (A) comprising an aliphatic hydrocarbon group and one amino group, said aliphatic hydrocarbon group having 6 or more carbon atoms in total, and
further comprises at least one of: an aliphatic hydrocarbon monoamine (B) comprising an aliphatic hydrocarbon group and one amino group, said aliphatic hydrocarbon group having 5 or less carbon atoms in total; and an aliphatic hydrocarbon diamine (C) comprising an aliphatic hydrocarbon group and two amino groups, said aliphatic hydrocarbon group having 8 or less carbon atoms in total.

(3) The silver particle coating composition according to the above (2), wherein the aliphatic hydrocarbon monoamine (A) is at least one selected from the group consisting of a linear alkylmonoamine having a linear alkyl group having 6 or more and 12 or less carbon atoms, and a branched alkylmonoamine having a branched alkyl group having 6 or more and 16 or less carbon atoms.

(4) The silver particle coating composition according to the above (2) or (3), wherein the aliphatic hydrocarbon monoamine (B) is an alkylmonoamine having 2 or more and 5 or less carbon atoms.

(5) The silver particle coating composition according to any one of the above (2) to (4), wherein the aliphatic hydrocarbon diamine (C) is an alkylenediamine in which one of the two amino groups is a primary amino group, and the other is a tertiary amino group.

The silver particle coating composition according to any one of the above, wherein the aliphatic hydrocarbon amine comprises the aliphatic hydrocarbon monoamine (A) and the aliphatic hydrocarbon monoamine (B).

The silver particle coating composition according to any one of the above, wherein the aliphatic hydrocarbon amine comprises the aliphatic hydrocarbon monoamine (A) and the aliphatic hydrocarbon diamine (C).

The silver particle coating composition according to any one of the above, wherein the aliphatic hydrocarbon amine comprises the aliphatic hydrocarbon monoamine (A), the aliphatic hydrocarbon monoamine (B), and the aliphatic hydrocarbon diamine (C).

The silver particle coating composition according to any one of the above, wherein the protective agent further comprises, in addition to the aliphatic amine, an aliphatic carboxylic acid.

The silver particle coating composition according to any one of the above, wherein the protective agent comprises no aliphatic carboxylic acid.

(6) The silver particle coating composition according to any one of the above (1) to (5), wherein the aliphatic hydrocarbon amine is used in a total amount of 1 to 50 moles per 1 mole of silver atoms in the silver nano-particles.

(7) The silver particle coating composition according to any one of the above (1) to (6), which is used for screen printing or intaglio offset printing.

(8) A method for producing a silver particle coating composition, the method comprising:
mixing an aliphatic hydrocarbon amine and a silver compound to form a complex compound comprising the silver compound and the amine;
thermally decomposing the complex compound by heating to form silver nano-particles;
washing the formed silver nano-particles with a solvent selected from the group consisting of a glycol ether-based solvent and a glycol ester-based solvent, and settling the silver nano-particles to remove a supernatant so that silver nano-particles in a wet state with the solvent are obtained; and
dispersing the silver nano-particles in a wet state into a dispersion solvent.

(9) The method for producing a silver particle coating composition according to the above (8), wherein the silver compound is silver oxalate.

A molecule of silver oxalate contains two silver atoms. When the silver compound is silver oxalate, the aliphatic hydrocarbon amine may be used in a total amount of 2 to 100 moles per 1 mole of silver oxalate.

A silver particle coating composition produced by the method according to the above (8) or (9), which is used for intaglio offset printing or screen printing.

(10) An electronic device comprising:

a substrate; and a silver conductive layer obtained by applying, onto the substrate, the silver particle coating composition according to any one of the above (1) to (7) or a silver particle coating composition produced by the method according to the above (8) or (9) and calcining the silver particle coating composition.

Examples of the electronic device include various circuit boards and modules.

A method for producing an electronic device, comprising:

applying, onto a substrate, the silver particle coating composition according to any one of the above to form a silver particle-containing coating layer, and then, calcining the coating layer to form a silver conductive layer.

The calcining may be performed at a temperature of 200° C. or less, for example, 150° C. or less, preferably 120° C. or less, for 2 hours or less, for example, 1 hour or less, preferably 30 minutes or less, more preferably 15 minutes or less. More specifically, the calcining may be performed under conditions of about 90° C. to 120° C. and about 10 minutes to 15 minutes, for example, 120° C. and 15 minutes.

A metal particle coating composition comprising:

metal nano-particles whose surfaces are coated with a protective agent comprising an aliphatic hydrocarbon amine; and a dispersion solvent, wherein the dispersion solvent comprises a solvent selected from the group consisting of a glycol ether-based solvent and a glycol ester-based solvent.

The substrate may be selected from a plastic substrate, a ceramic substrate, a glass substrate, and a metallic substrate.

Effects of the Invention

The silver particle coating composition according to the present invention contains silver nano-particles whose surfaces are coated with a protective agent containing an aliphatic hydrocarbon amine and a dispersion solvent, and the dispersion solvent contains a solvent, which has been used as a washing solvent, selected from a glycol ether-based solvent and a glycol ester-based solvent.

The silver nano-particles whose surfaces are coated with a protective agent containing an aliphatic hydrocarbon amine are prepared by so-called thermal decomposition of a silver complex compound. In the present invention, when an aliphatic hydrocarbon monoamine (A) having 6 or more carbon atoms in total, and at least one of an aliphatic hydrocarbon monoamine (B) having 5 or less carbon atoms in total and an aliphatic hydrocarbon diamine (C) having 8 or less carbon atoms in total are used as aliphatic hydrocarbon amine compounds that function as a complex-forming agent and/or a protective agent, silver nano-particles whose surfaces are coated with these aliphatic amine compounds are formed.

The aliphatic hydrocarbon monoamine (B) and the aliphatic hydrocarbon diamine (C) each have a short carbon chain, and are therefore easily removed from the surfaces of the silver particles in a short time of 2 hours or less, for example, 1 hour or less, preferably 30 minutes or less even by low-temperature calcining at a temperature of 200° C. or less, for example, 150° C. or less, preferably 120° C. or less. In addition, the presence of the monoamine (B) and/or the diamine (C) reduces the amount of the aliphatic hydrocarbon monoamine (A) adhered to the surfaces of the silver particles. This makes it possible to easily remove these aliphatic amine compounds from the surfaces of the silver particles in such a short time as described above even by low-temperature calcining at such a low temperature as described above, thereby allowing the silver particles to be sufficiently sintered.

The dispersion solvent comprises a solvent, which has been used as a washing solvent, selected from a glycol ether-based solvent and a glycol ester-based solvent. As compared to, for example, alcohols having the same number of carbon atoms as these solvents, these solvents have a higher boiling point and are therefore less likely to evaporate. Therefore, a temporal change in the composition of the silver particle coating composition (silver particle-containing ink or silver particle-containing paste) is suppressed so that the quality of the silver particle coating composition is maintained constant. Accordingly, the silver particle coating composition of the present invention is excellent in printability even when continuous printing is performed by any printing method.

The present invention is applied also to a metal particle coating composition containing a metal other than silver.

According to the present invention, it is possible to form a conductive film or a conductive line even on any plastic substrate having low heat resistance, such as a PET substrate or a polypropylene substrate, preferably by intaglio offset printing or screen printing. The silver particle coating composition according to the present invention is suitable for use in elements in recent various electronic devices.

MODES FOR CARRYING OUT THE INVENTION

A silver particle coating composition according to the present invention contains silver nano-particles (N) whose surfaces are coated with a protective agent containing an aliphatic hydrocarbon amine and a dispersion solvent, and the dispersion solvent contains a solvent, which has been used as a washing solvent, selected from a glycol ether-based solvent and a glycol ester-based solvent. It is to be noted that the silver particle coating composition includes both so-called silver ink and silver paste.

[Silver Nano-Particles (N) Whose Surfaces are Coated with Aliphatic Hydrocarbon Amine Protective Agent]

Silver nano-particles (N) can be produced by mixing an aliphatic hydrocarbon amine and a silver compound to form a complex compound comprising the silver compound and the amine; and thermally decomposing the complex compound by heating. Therefore, a method for producing silver nano-particles (N) mainly includes a complex compound-forming step, and a thermal decomposition step of the complex compound. The obtained silver nano-particles (N) are subjected to a washing step, and then, a dispersion step for producing a coating composition.

In this description, the term "nano-particles" means that primary particles have a size (average primary particle diameter), which is measured by observation result with a scanning electron microscope (SEM), of less than 1,000 nm. The particle size refers to the size of a particle not including a protective agent (stabilizer) present on (coating) the surface of the particle (i.e., refers to the size of silver itself). In the present invention, the silver nano-particles have an average primary particle diameter of, for example, 0.5 nm to 100 nm, preferably 0.5 nm to 80 nm, more preferably 1 nm to 70 nm, even more preferably 1 nm to 60 nm.

The above-mentioned silver compound used in the present invention is one that is easily decomposed by heating to generate metallic silver. Examples of such a silver compound that can be used include: silver carboxylates such as silver formate, silver acetate, silver oxalate, silver malonate, silver benzoate, and silver phthalate; silver halides such as silver fluoride, silver chloride, silver bromide, and silver iodide; silver sulfate, silver nitrate, silver carbonate, and the like. In terms of the fact that metallic silver is easily generated by decomposition and impurities other than silver are less likely to be generated, silver oxalate is preferably used. Silver oxalate is advantageous in that silver oxalate has a high silver content, and metallic silver is directly obtained by thermal decomposition without the need for a reducing agent, and therefore impurities derived from a reducing agent are less likely to remain.

When metal nano-particles containing another metal other than silver are produced, a metal compound that is easily decomposed by heating to generate a desired metal is used instead of the above-mentioned silver compound. As such a metal compound, a metal salt corresponding to the above-mentioned silver compound can be used. Examples of such a metal compound include: metal carboxylates; metal halides; and metal salt compounds such as metal sulfates, metal nitrates, and metal carbonates. Among them, in terms of the fact that a metal is easily generated by decomposition and impurities other than a metal are less likely to be generated, metal oxalate is preferably used. Examples of another metal include Al, Au, Pt, Pd, Cu, Co, Cr, In, and Ni.

Further, in order to obtain a composite with silver, the above-mentioned silver compound and the above-mentioned compound of another metal other than silver may be used in combination. Examples of another metal include Al, Au, Pt, Pd, Cu, Co, Cr, In, and Ni. The silver composite is composed of silver and one or more other metals, and examples thereof include Au—Ag, Ag—Cu, Au—Ag—Cu, Au—Ag—Pd, and the like. The amount of silver occupies at least 20% by weight, usually at least 50% by weight, for example, at least 80% by weight of the total amount of the metals.

In the present invention, in the complex compound-forming step, an aliphatic hydrocarbon amine and a silver compound may be mixed in the absence of a solvent, but are preferably mixed in the presence of an alcohol solvent having 3 or more carbon atoms to form a complex compound comprising the silver compound and the amine.

As the alcohol solvent, an alcohol having 3 to 10 carbon atoms, preferably an alcohol having 4 to 6 carbon atoms can be used. Examples of such an alcohol include n-propanol (boiling point (bp): 97° C.), isopropanol (bp: 82° C.), n-butanol (bp: 117° C.), isobutanol (bp: 107.89° C.), sec-butanol (bp: 99.5° C.), tert-butanol (bp: 82.45° C.), n-pentanol (bp: 136° C.), n-hexanol (bp: 156° C.), n-octanol (bp: 194° C.), 2-octanol (bp: 174° C.), and the like. Among them, butanols selected from n-butanol, isobutanol, sec-butanol and tert-butanol, and hexanols are preferred in consideration of the fact that the temperature of the thermal decomposition step of the complex compound subsequently performed can be increased, and post-treatment after the formation of silver nano-particles is easy. Particularly, n-butanol and n-hexanol are preferred.

In order to sufficiently stir a silver compound-alcohol slurry, the alcohol solvent is used in an amount of, for example, 120 parts by weight or more, preferably 130 parts by weight or more, more preferably 150 parts by weight or more with respect to 100 parts by weight of the silver compound. The upper limit of the amount of the alcohol-based solvent is not particularly limited, and is, for example, 1,000 parts by weight or less, preferably 800 parts by weight or less, more preferably 500 parts by weight or less with respect to 100 parts by weight of the silver compound.

In the present invention, the mixing of an aliphatic hydrocarbon amine and a silver compound in the presence of an alcohol solvent having 3 or more carbon atoms can be performed in several ways.

For example, the mixing may be performed by first mixing a solid silver compound and an alcohol solvent to obtain a silver compound-alcohol slurry [slurry-forming step], and then by adding an aliphatic hydrocarbon amine to the obtained silver compound-alcohol slurry. The slurry represents a mixture in which the solid silver compound is dispersed in the alcohol solvent. The slurry may be obtained by adding the alcohol solvent to the solid silver compound contained in a reaction container.

Alternatively, the silver compound-alcohol slurry may be added to the aliphatic hydrocarbon amine and the alcohol solvent contained in a reaction container.

In the present invention, as an aliphatic hydrocarbon amine that functions as a complex-forming agent and/or a protective agent, for example, one may be used, which contains an aliphatic hydrocarbon monoamine (A) having a hydrocarbon group having 6 or more carbon atoms in total, and further contains at least one of an aliphatic hydrocarbon monoamine (B) comprising an aliphatic hydrocarbon group and one amino group, said aliphatic hydrocarbon group having 5 or less carbon atoms in total; and an aliphatic hydrocarbon diamine (C) comprising an aliphatic hydrocarbon group and two amino groups, said aliphatic hydrocarbon group having 8 or less carbon atoms in total. These respective components are usually used in the form of an amine mixture liquid, but mixing of the amines with the silver compound (or alcohol slurry thereof) does not always need to be performed using a mixture of the amines. These amines may be added one by one to the silver compound (or alcohol slurry thereof).

Although established, the term "aliphatic hydrocarbon monoamine" in this description refers to a compound composed of one to three monovalent aliphatic hydrocarbon groups and one amino group. The "hydrocarbon group" refers to a group only composed of carbon and hydrogen. However, if necessary, each of the aliphatic hydrocarbon monoamine (A) and the aliphatic hydrocarbon monoamine (B) may have, on its hydrocarbon group, a substituent group containing a hetero atom (atom other than carbon and hydrogen) such as an oxygen atom or a nitrogen atom. This nitrogen atom does not constitute an amino group.

Further, the "aliphatic hydrocarbon diamine" refers to a compound composed of a bivalent aliphatic hydrocarbon group (alkylene group), two amino groups between which said aliphatic hydrocarbon group is interposed, and, if necessary, aliphatic hydrocarbon group(s) (alkyl group(s)) substituted for hydrogen atom(s) on the amino group(s). However, if necessary, the aliphatic hydrocarbon diamine (C) may have, on its hydrocarbon group, a substituent group containing a hetero atom (atom other than carbon and hydrogen) such as an oxygen atom or a nitrogen atom. This nitrogen atom does not constitute an amino group.

The aliphatic hydrocarbon monoamine (A) having 6 or more carbon atoms in total has, due to its hydrocarbon chain, high performance as a protective agent (stabilizer) onto the surfaces of resulting silver particles.

The aliphatic hydrocarbon monoamine (A) includes a primary amine, a secondary amine, and a tertiary amine. Examples of the primary amine include saturated aliphatic hydrocarbon monoamines (i.e., alkylmonoamines) having a C6 to C18 linear aliphatic hydrocarbon group such as hexylamine, heptylamine, octylamine, nonylamine, decylamine, undecylamine, dodecylamine, tridecylamine, tetradecylamine, pentadecylamine, hexadecylamine, heptadecylamine, and octadecylamine. Examples of the saturated aliphatic hydrocarbon monoamine other than the above-mentioned linear aliphatic monoamines include branched aliphatic hydrocarbon monoamines having a C6 to C16, preferably C6 to C8 branched aliphatic hydrocarbon group such as isohexylamine, 2-ethylhexylamine, and tert-octylamine. Another example of the saturated aliphatic hydrocarbon monoamine includes cyclohexylamine. Other examples of the primary amine include unsaturated aliphatic hydrocarbon monoamines (i.e., alkenylmonoamines) such as oleylamine.

Examples of the secondary amine include linear dialkylmonoamines such as N,N-dipropylamine, N,N-dibutylamine, N,N-dipentylamine, N,N-dihexylamine, N,N-diheptylamine, N,N-dioctylamine, N,N-dinonylamine, N,N-didecylamine, N,N-diundecylamine, N,N-didodecylamine, N-methyl-N-propylamine, N-ethyl-N-propylamine, and N-propyl-N-butylamine. Examples of the tertiary amine include tributylamine and trihexylamine.

Other examples of the secondary amine include branched secondary amines such as N,N-diisohexylamine and N,N-di(2-ethylhexyl)amine. Examples of the tertiary amine include triisohexylamine and tri(2-ethylhexyl)amine. In the case of N,N-di(2-ethylhexyl)amine, the number of carbon atoms in a 2-ethylhexyl group is 8, but the total number of carbon atoms contained in the amine compound is 16. In the case of tri(2-ethylhexyl)amine, the total number of carbon atoms contained in the amine compound is 24.

Among the above-mentioned monoamines (A), regarding the linear monoamines, saturated aliphatic hydrocarbon monoamines having 6 or more carbon atoms are preferred. When the number of carbon atoms is 6 or more, space can be secured between silver particles by adsorption of amino groups to the surfaces of the silver particles, thereby improving the effect of preventing agglomeration of the silver particles. The upper limit of the number of carbon atoms is not particularly limited, but saturated aliphatic monoamines having up to 18 carbon atoms are usually preferred in consideration of ease of availability, ease of removal during calcining, etc. Particularly, alkylmonoamines having 6 to 12 carbon atoms such as hexylamine, heptylamine, octylamine, nonylamine, decylamine, undecylamine, and dodecylamine are preferably used. The above-mentioned linear aliphatic hydrocarbon monoamines may be used singly or in combination of two or more of them.

The use of the branched aliphatic hydrocarbon monoamine compound makes it possible to coat a larger surface area of silver particles due to the steric factor of its branched aliphatic hydrocarbon group even when the amount of the branched aliphatic hydrocarbon monoamine compound attached to the surfaces of the silver particles is reduced, as compared to when the linear aliphatic hydrocarbon monoamine compound having the same carbon number is used. Therefore, silver nano-particles can be properly stabilized even when the amount of the branched aliphatic hydrocarbon monoamine compound adhered to the surfaces of the silver particles is reduced. The amount of a protective agent (organic stabilizer) that should be removed during calcining is reduced, and therefore the organic stabilizer can be efficiently removed even by low-temperature calcining at a temperature of 200° C. or less, thereby allowing the silver particles to be sufficiently sintered.

Among the above-mentioned branched aliphatic hydrocarbon monoamines, preferred are branched alkylmonoamine compounds whose main chain has 5 to 6 carbon atoms, such as isohexylamine and 2-ethylhexylamine. When the main chain has 5 to 6 carbon atoms, it is easy to properly stabilize silver nano-particles. Further, from the viewpoint of the steric factor of the branched aliphatic group, like 2-ethylhexylamine, branching at the second carbon atom from the N-atom side is effective. The above-mentioned branched aliphatic monoamines may be used singly or in combination of two or more of them.

In the present invention, the linear aliphatic hydrocarbon monoamine and the branched aliphatic hydrocarbon monoamine may be used in combination as the aliphatic hydrocarbon monoamine (A) to obtain their respective advantages.

The aliphatic hydrocarbon monoamine (B) having 5 or less carbon atoms in total has a shorter carbon chain than the aliphatic monoamine (A) having 6 or more carbon atoms in total, and therefore the function of the aliphatic hydrocarbon monoamine (B) itself as a protective agent (stabilizer) is considered to be low. However, the aliphatic hydrocarbon monoamine (B) has a high ability to coordinate to silver in the silver compound due to its higher polarity than the aliphatic monoamine (A), and is therefore considered to have the effect of promoting complex formation. In addition, the aliphatic hydrocarbon monoamine (B) has a short carbon chain, and therefore can be removed from the surfaces of silver particles in a short time of 30 minutes or less, or 20 minutes or less, even by low-temperature calcining at a temperature of, for example, 120° C. or less, or about 100° C. or less, which is effective for low-temperature calcining of resulting silver nano-particles.

Examples of the aliphatic hydrocarbon monoamine (B) include saturated aliphatic hydrocarbon monoamines (i.e., alkylmonoamines) having 2 to 5 carbon atoms such as ethylamine, n-propylamine, isopropylamine, n-butylamine, isobutylamine, sec-butylamine, tert-butylamine, pentylamine, isopentylamine, and tert-pentylamine. Other examples of the aliphatic hydrocarbon monoamine (B) include dialkylmonoamines such as N,N-dimethylamine and N,N-diethylamine.

Among them, n-butylamine, isobutylamine, sec-butylamine, tert-butylamine, pentylamine, isopentylamine, tert-pentylamine, and the like are preferred, and the above-mentioned butylamines are particularly preferred. The above-mentioned aliphatic hydrocarbon monoamines (B) may be used singly or in combination of two or more of them.

The aliphatic hydrocarbon diamine (C) having 8 or less carbon atoms in total has a high ability to coordinate to silver in the silver compound, and therefore has the effect of promoting complex formation. Generally, aliphatic hydrocarbon diamines have higher polarity than aliphatic hydrocarbon monoamines, and therefore have a high ability to coordinate to silver in a silver compound. Further, the aliphatic hydrocarbon diamine (C) has the effect of promoting lower-temperature and shorter-time thermal decomposition in the thermal decomposition step of the complex compound, and therefore production of silver nano-particles can be more efficiently performed. Further, a protective film containing the aliphatic diamine (C) on silver particles has high polarity, which improves the dispersion stability of the silver particles in a dispersion medium comprising a highly-polar solvent. Furthermore, the aliphatic diamine (C) has a short carbon chain, and therefore can be removed from the surfaces of silver particles in a short time of 30 minutes or less, or 20 minutes or less, even by low-temperature calcining at a temperature of, for example, 120° C. or less, or about 100° C. or less, which is effective for low-temperature and short-time calcining of resulting silver nano-particles.

The aliphatic hydrocarbon diamine (C) is not particularly limited, and examples thereof include ethylenediamine, N,N-dimethylethylenediamine, N,N'-dimethylethylenediamine, N,N-diethylethylenediamine, N,N'-diethylethylenediamine, 1,3-propanediamine, 2,2-dimethyl-1,3-propanediamine, N,N-dimethyl-1,3-propanediamine, N,N'-dimethyl-1,3-propanediamine, N,N-diethyl-1,3-propanediamine, N,N'-diethyl-1,3-propanediamine, 1,4-butanediamine, N,N-dimethyl-1,4-butanediamine, N,N'-dimethyl-1,4-butanediamine, N,N-diethyl-1,4-butanediamine, N,N'-diethyl-1,4-butanediamine, 1,5-pentanediamine, 1,5-diamino-2-methylpentane, 1,6-hexanediamine, N,N-dimethyl-1,6-hexanediamine, N,N'-dimethyl-1,6-hexanediamine, 1,7-heptanediamine, 1,8-octanediamine, and the like. They are all alkylenediamines having 8 or less carbon atoms in total in which at least one of the two amino groups is a primary amino group or a secondary amino group, and have a high ability to coordinate to silver in the silver compound, and therefore have the effect of promoting complex formation.

Among them, N,N-dimethylethylenediamine, N,N-diethylethylenediamine, N,N-dimethyl-1,3-propanediamine, N,N-diethyl-1,3-propanediamine, N,N-dimethyl-1,4-butanediamine, N,N-diethyl-1,4-butanediamine, N,N-dimethyl-1,6-hexanediamine, and the like are preferred, which are alkylenediamines having 8 or less carbon atoms in total in which one of the two amino groups is a primary amino group ($-NH_2$) and the other is a tertiary amino group ($-NR^1R^2$). Such preferred alkylenediamines are represented by the following structural formula:

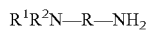

$R^1R^2N-R-NH_2$ wherein R represents a bivalent alkylene group, $R^1$ and $R^2$ may be the same or different from each other and each represent an alkyl group, and the total number of carbon atoms of R, $R^1$, and $R^2$ is 8 or less. The alkylene group does not usually contain a hetero atom (atom other than carbon and hydrogen) such as an oxygen atom or a nitrogen atom, but if necessary, may have a substituent group containing such a hetero atom. Further, the alkyl group does not usually contain a hetero atom such as an oxygen atom or a nitrogen atom, but if necessary, may have a substituent group containing such a hetero atom.

When one of the two amino groups is a primary amino group, the ability to coordinate to silver in the silver compound is high, which is advantageous for complex formation, and when the other is a tertiary amino group, a resulting complex is prevented from having a complicated network structure because a tertiary amino group has a poor ability to coordinate to a silver atom. If a complex has a complicated network structure, there is a case where the thermal decomposition step of the complex requires a high temperature. Among these diamines, those having 6 or less carbon atoms in total are preferred, and those having 5 or less carbon atoms in total are more preferred in terms of the fact that they can be removed from the surfaces of silver particles in a short time even by low-temperature calcining. The above-mentioned aliphatic hydrocarbon diamines (C) may be used singly or in combination of two or more of them.

The ratio between the aliphatic hydrocarbon monoamine (A) having 6 or more carbon atoms in total, and one or both of the aliphatic hydrocarbon monoamine (B) having 5 or less carbon atoms in total and the aliphatic hydrocarbon diamine (C) having 8 or less carbon atoms in total used in the present invention is not particularly limited. However, for example, the amount of the aliphatic monoamine (A) may be 5 mol % to 65 mol %; and the total amount of the aliphatic monoamine (B) and the aliphatic diamine (C) may be 35 mol % to 95 mol %, on the basis of the total amount of the amines [(A)+(B)+(C)]. By setting the content of the aliphatic monoamine (A) to 5 mol % to 65 mol %, the carbon chain of the component (A) can easily fulfill its function of protecting and stabilizing the surfaces of resulting silver particles. If the content of the component (A) is less than 5 mol %, there is a case where the protective and stabilization function is poorly developed. On the other hand, if the content of the component (A) exceeds 65 mol %, the protective and stabilization function is sufficient, but the component (A) is poorly removed by low-temperature calcining. When the branched aliphatic monoamine is used as the component (A), the amount of the branched aliphatic monoamine may be 10 mol % to 50 mol % to satisfy that the content of the aliphatic monoamine (A) is 5 mol % to 65 mol %.

When the aliphatic monoamine (A), and further both the aliphatic monoamine (B) and the aliphatic diamine (C) are used, the ratio among them used is not particularly limited. However, for example, the amount of the aliphatic monoamine (A) may be 5 mol % to 65 mol %;

the amount of the aliphatic monoamine (B) may be 5 mol % to 70 mol %; and the amount of the aliphatic diamine (C) may be 5 mol % to 50 mol %, on the basis of the total amount of the amines [(A)+(B)+(C)]. When the branched aliphatic monoamine is used as the component (A), the amount of the branched aliphatic monoamine may be 10 mol % to 50 mol % to satisfy that the content of the aliphatic monoamine (A) is 5 mol % to 65 mol %.

In this case, the lower limit of the content of the component (A) is preferably 10 mol % or more, more preferably 20 mol % or more. The upper limit of the content of the component (A) is preferably 65 mol % or less, more preferably 60 mol % or less.

By setting the content of the aliphatic monoamine (B) to 5 mol % to 70 mol %, the effect of promoting complex formation is easily obtained, the aliphatic monoamine (B) itself can contribute to low-temperature and short-time calcining, and the effect of facilitating the removal of the aliphatic diamine (C) from the surfaces of silver particles during calcining is easily obtained. If the content of the component (B) is less than 5 mol %, there is a case where the effect of promoting complex formation is poor, or the component (C) is poorly removed from the surfaces of silver particles during calcining. On the other hand, if the content of the component (B) exceeds 70 mol %, the effect of promoting complex formation is obtained, but the content of the aliphatic monoamine (A) is relatively reduced so that the surfaces of resulting silver particles are poorly protected and stabilized. The lower limit of the content of the component (B) is preferably 10 mol % or more, more preferably 15 mol % or more. The upper limit of the content of the component (B) is preferably 65 mol % or less, more preferably 60 mol % or less.

By setting the content of the aliphatic diamine (C) to 5 mol % to 50 mol %, the effect of promoting complex formation and the effect of promoting the thermal-decomposition of the complex are easily obtained, and further, the dispersion stability of silver particles in a dispersion medium containing a highly-polar solvent is improved because a protective film containing the aliphatic diamine (C) on silver particles has high polarity. If the content of the component (C) is less than 5 mol %, there is a case where the effect of promoting complex formation and the effect of promoting the thermal-decomposition of the complex are poor. On the other hand, if the content of the component (C) exceeds 50 mol %, the effect of promoting complex formation and the effect of promoting the thermal-decomposition of the complex are obtained, but the content of the aliphatic monoamine (A) is relatively reduced so that the surfaces of resulting silver particles are poorly protected and stabilized. The lower limit of the content of the component (C) is preferably 5 mol % or more, more preferably 10 mol % or more. The upper limit of the content of the component (C) is preferably 45 mol % or less, more preferably 40 mol % or less.

When the aliphatic monoamine (A) and the aliphatic monoamine (B) are used (without using the aliphatic diamine (C)), the ratio between them used is not particularly limited. However, in consideration of the functions of the respective components, for example, the amount of the aliphatic monoamine (A) may be 5 mol % to 65 mol %; and the amount of the aliphatic monoamine (B) may be 35 mol % to 95 mol %, on the basis of the total amount of the amines [(A)+(B)]. When the branched aliphatic monoamine is used as the component (A), the amount of the branched aliphatic monoamine may be 10 mol % to 50 mol % to satisfy that the content of the aliphatic monoamine (A) is 5 mol % to 65 mol %.

When the aliphatic monoamine (A) and the aliphatic diamine (C) are used (without using the aliphatic monoamine (B)), the ratio between them used is not particularly limited. However, in consideration of the functions of the respective components, for example, the amount of the aliphatic monoamine (A) may be 5 mol % to 65 mol %; and the amount of the aliphatic diamine (C) may be 35 mol % to 95 mol %, on the basis of the total amount of the amines [(A)+(C)]. When the branched aliphatic monoamine is used as the component (A), the amount of the branched aliphatic monoamine may be 10 mol % to 50 mol % to satisfy that the content of the aliphatic monoamine (A) is 5 mol % to 65 mol %.

The above ratios among/between the aliphatic monoamine (A) and the aliphatic monoamine (B) and/or the aliphatic diamine (C) used are examples and may be changed in various manners.

In the present invention, the use of the aliphatic monoamine (B) and/or the aliphatic diamine (C) each having a high ability to coordinate to silver in the silver compound makes it possible, depending on their contents, to reduce the amount of the aliphatic monoamine (A) having 6 or more carbon atoms in total attached to the surfaces of silver particles. Therefore, these aliphatic amine compounds are easily removed from the surfaces of silver particles even by the above-described low-temperature and short-time calcining so that the silver particles (N) are sufficiently sintered.

In the present invention, the total amount of the aliphatic hydrocarbon amine [e.g., (A) and (B) and/or (C)] is not particularly limited, but may be about 1 to 50 moles per 1 mole of silver atoms in the silver compound as a starting material. If the total amount of the amine components [(A) and (B) and/or (C)] is less than 1 mole per 1 mole of the silver atoms, there is a possibility that part of the silver compound remains without being converted to a complex compound in the complex compound-forming step so that, in the subsequent thermal decomposition step, silver particles have poor uniformity and become enlarged or the silver compound remains without being thermally decomposed. On the other hand, it is considered that even when the total amount of the amine components [(A) and (B) and/or (C)] exceeds about 50 moles per 1 mole of the silver atoms, there are few advantages. In order to prepare a dispersion liquid of silver nano-particles in substantially the absence of solvent, the total amount of the amine components may be, for example, about 2 moles or more. By setting the total amount of the amine components to about 2 to 50 moles, the complex compound-forming step and the thermal-decomposition step of the complex compound can be successfully performed. The lower limit of the total amount of the amine components is preferably 2 moles or more, more preferably 6 moles or more per 1 mole of silver atoms in the silver compound. It is to be noted that the molecule of silver oxalate contains two silver atoms.

In the present invention, an aliphatic carboxylic acid (D) may further be used as a stabilizer to further improve the dispersibility of silver nano-particles (N) in a dispersion medium. The aliphatic carboxylic acid (D) may be used together with the above-described amines, and may be used by adding to the above-described amine mixture liquid. The use of the aliphatic carboxylic acid (D) may improve the stability of silver nano-particles, especially the stability of silver nano-particles in a coating material state where the silver nano-particles are dispersed in an organic solvent.

As the aliphatic carboxylic acid (D), a saturated or unsaturated aliphatic carboxylic acid is used. Examples of the aliphatic carboxylic acid include saturated aliphatic monocarboxylic acids having 4 or more carbon atoms such as butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and eicosenoic acid; and unsaturated aliphatic monocarboxylic acids having 8 or more carbon atoms such as oleic acid, elaidic acid, linoleic acid, and palmitoleic acid.

Among them, saturated or unsaturated aliphatic monocarboxylic acids having 8 to 18 carbon atoms are preferred. When the number of carbon atoms is 8 or more, space can be provided between silver particles by adsorption of carboxylic groups to the surfaces of the silver particles, thereby improving the effect of preventing agglomeration of the silver particles. In consideration of ease of availability, ease of removal during calcining, etc., saturated or unsaturated aliphatic monocarboxylic compounds having up to 18 carbon atoms are usually preferred. Particularly, octanoic acid, oleic acid, and the like are preferably used. The above-mentioned aliphatic carboxylic acids (D) may be used singly or in combination of two or more of them.

When the aliphatic carboxylic acid (D) is used, the amount of the aliphatic carboxylic acid (D) used may be, for example, about 0.05 to 10 moles, preferably 0.1 to 5 moles, more preferably 0.5 to 2 moles per 1 mole of silver atoms in the silver compound as a starting material. If the amount of the component (D) is less than 0.05 moles per 1 mole of the silver atoms, the effect of improving dispersion stability obtained by adding the component (D) is poor. On the other hand, if the amount of the component (D) reaches 10 moles, the effect of improving dispersion stability is saturated and the component (D) is poorly removed by low-temperature calcining. It is to be noted that the aliphatic carboxylic acid (D) does not necessarily need to be used in consideration of removal of the component (D) by low-temperature calcining.

In the present invention, a mixture liquid containing the respective aliphatic hydrocarbon amine components used, for example, an amine mixture liquid containing the aliphatic monoamine (A) and further one or both of the aliphatic monoamine (B) and the aliphatic diamine (C) is usually prepared [preparation step for amine mixture liquid].

The amine mixture liquid can be prepared by stirring the amine component (A), the amine component (B) and/or the amine component (C), and if used, the carboxylic acid component (D) in a given ratio at a room temperature.

The aliphatic hydrocarbon amine mixture liquid containing the respective amine components is added to the silver compound (or alcohol slurry thereof) to form a complex compound comprising the silver compound and the amines [complex compound-forming step]. The amine components may be added to the silver compound (or alcohol slurry thereof) one by one without using a mixture liquid thereof.

When metal nano-particles containing another metal other than silver are produced, a metal compound containing a desired metal (or alcohol slurry thereof) is used instead of the silver compound (or alcohol slurry thereof).

The silver compound (or alcohol slurry thereof) or the metal compound (or alcohol slurry thereof), and a given amount of the amine mixture liquid are mixed. The mixing may be performed at ordinary temperature. The "ordinary temperature" refers to 5 to 40° C. depending on ambient temperature. For example, the ordinary temperature refers to 5 to 35° C. (JIS Z 8703), 10 to 35° C., or 20 to 30° C. The ordinary temperature may be a normal room temperature (e.g., 15 to 30° C.). At this time, the mixing may be performed by stirring them, or may be performed by stirring them while a mixture of them is appropriately cooled to a temperature within the above range, for example, about 5 to 15° C. because the coordination reaction of the amines to the silver compound (or the metal compound) is accompanied by heat generation. When the mixing of the silver compound and the amine mixture liquid is performed in the presence of an alcohol having 3 or more carbon atoms, stirring and cooling can be successfully performed. The alcohol and excess amines function as a reaction medium.

In a method for thermally decomposing a silver-amine complex, conventionally, a liquid aliphatic amine component is first placed in a reaction container, and then a powder silver compound (silver oxalate) is added thereto. The liquid aliphatic amine component is flammable, and therefore addition of the powder silver compound to the liquid aliphatic amine compound is dangerous. That is, there is a risk of ignition due to static electricity generated by addition of the powder silver compound. Further, there is also a risk of a runaway exothermic reaction due to a complex-forming reaction locally caused by addition of the powder silver compound. Such risks can be avoided by mixing the silver compound and the amine mixture liquid in the presence of the above-mentioned alcohol. Therefore, scaled-up industrial-level production is also safely performed.

When a complex compound is formed, the formed complex compound generally exhibits a color corresponding to its components, and therefore the endpoint of a complex compound-forming reaction can be determined by detecting the end of a change in the color of a reaction mixture by an appropriate spectroscopic method or the like. A complex compound formed from silver oxalate is generally colorless (appears white to our eyes), but even in such a case, it is possible to determine the state of formation of a complex compound based on a change in the form of a reaction mixture such as a change in viscosity. For example, the time of formation reaction of the complex compound is about 30 minutes to 3 hours. In this way, a silver-amine complex (or a metal-amine complex) is obtained in a medium mainly containing the alcohol and the amines.

Then, the obtained complex compound is thermally decomposed by heating to form silver nano-particles (N) [thermal decomposition step of complex compound]. When a metal compound containing another metal other than silver is used, desired metal nano-particles are formed. The silver nano-particles (metal nano-particles) are formed without using a reducing agent. However, if necessary, an appropriate reducing agent may be used without impairing the effects of the present invention.

In such a metal-amine complex decomposition method, the amines generally play a role in controlling the mode of formation of fine-particles by agglomeration of an atomic metal generated by decomposition of the metal compound, and in forming film on the surfaces of the formed metal fine-particles to prevent reagglomeration of the fine-particles. That is, it is considered that when the complex compound of the metal compound and the amine is heated, the metal compound is thermally decomposed to generate an atomic metal while the coordination bond of the amine to a metallic atom is maintained, and then the metallic atoms coordinated with the amine are agglomerated to form metal nano-particles coated with an amine protective film.

At this time, the thermal decomposition is preferably performed by stirring the complex compound in a reaction medium mainly containing the alcohol (used if necessary) and the amines. The thermal decomposition may be performed in a temperature range in which coated silver nano-particles (or coated metal nano-particles) are formed, but from the viewpoint of preventing the elimination of the amine from the surfaces of silver particles (or from the surfaces of metal particles), the thermal decomposition is preferably performed at a temperature as low as possible within such a temperature range. In the case of the complex compound from silver oxalate, the thermal decomposition temperature may be, for example, about 80° C. to 120° C., preferably about 95° C. to 115° C., more specifically about 100° C. to 110° C. In the case of the complex compound from silver oxalate, heating at about 100° C. allows decomposition and reduction of silver ions to occur so that coated silver nano-particles can be obtained. Further, the thermal decomposition of silver oxalate itself generally occurs at about 200° C. The reason why the thermal decomposition temperature of a silver oxalate-amine complex compound is about 100° C. lower than that of silver oxalate itself is not clear, but it is estimated that a coordination polymer structure formed by pure silver oxalate is broken by forming a complex compound of silver oxalate with the amine.

Further, the thermal decomposition of the complex compound is preferably performed in an inert gas atmosphere such as argon, but may be performed in the atmosphere.

When the complex compound is thermally decomposed, a suspension exhibiting a glossy blue color is obtained. In order to remove the excess amines etc. from the suspension, decantation and washing with a washing solvent selected from a glycol ether-based solvent and a glycol ester-based solvent are performed to obtain desired stable coated silver nano-particles (N) (or coated metal nano-particles) in a wet state with the washing solvent [washing step of silver nano-particles]. The silver nano-particles (N) in a wet state with the washing solvent are subjected to preparation of a silver particle coating composition (silver particle-containing ink or silver particle-containing paste).

The decantation and washing may be performed a plurality of times. In this case, a washing solvent selected from a glycol ether-based solvent and a glycol ester-based solvent is used in at least the last decantation and washing.

In the decantation and washing other than the last decantation and washing, a glycol ether-based solvent and/or a glycol ester-based solvent may be used, or alternatively, water or another organic solvent may be used. Examples of the organic solvent that may be used include aliphatic hydrocarbon solvents such as pentane, hexane, heptane, octane, nonane, decane, undecane, dodecane, tridecane, and tetradecane; alicyclic hydrocarbon solvents such as cyclohexane; aromatic hydrocarbon solvents such as toluene, xylene, and mesitylene; alcohol solvents such as methanol, ethanol, propanol, and butanol; acetonitrile; and mixed solvents of them. Among these other organic solvents, alcohol solvents such as methanol, ethanol, propanol, and butanol are excellent in washing efficiency. Another solvent used in the decantation and washing other than the last decantation and washing is replaced with a glycol ether-based solvent and/or a glycol ester-based solvent.

The glycol ether-based solvent is not particularly limited, and examples thereof include ethylene glycol monomethyl ether (bp: 124.5° C.), diethylene glycol monomethyl ether, ethylene glycol monoethyl ether, diethylene glycol monoethyl ether, ethylene glycol monobutyl ether, diethylene glycol monobutyl ether (butyl carbitol: BC, bp: 230° C.), propylene glycol monomethyl ether, dipropylene glycol monomethyl ether, diethylene glycol monohexyl ether (hexyl carbitol: HC, bp: 260° C.), and diethylene glycol mono 2-ethyl hexyl ether. The above-mentioned glycol ether-based solvents may be used singly or in combination of two or more of them. These solvents have higher polarity than an aliphatic hydrocarbon solvent such as tetradecane, or n-decanol that is a high-boiling-point alcohol (bp: 236° C. (764 mmHg)), and are therefore excellent in the efficiency of washing silver nano-particles. Further, as compared to, for example, alcohols having the same number of carbon atoms as these solvents, these solvents have a higher boiling point and are therefore less likely to evaporate.

Examples of the glycol ester-based solvent include a glycol monoester-based solvent and a glycol diester-based solvent.

The glycol ester-based solvent is not particularly limited, and examples thereof include glycol monoether monoesters such as ethylene glycol monomethyl ether acetate (bp: 145° C.), diethylene glycol monomethyl ether acetate, ethylene glycol monoethyl ether acetate (bp: 156° C.), diethylene glycol monoethyl ether acetate (bp: 218° C.), ethylene glycol monobutyl ether acetate (bp: 192° C.), diethylene glycol monobutyl ether acetate (butyl carbitol acetate: BCA, bp: 249° C.), propylene glycol monomethyl ether acetate (PMA: 1-methoxy-2-propyl acetate, bp: 146° C.), and dipropylene glycol monomethyl ether acetate (bp: 209° C.); and glycol diesters such as ethylene glycol diacetate (bp: 196° C.), diethylene glycol diacetate, propylene glycol diacetate (bp: 190° C.), dipropylene glycol diacetate, 1,4-butanediol diacetate (1,4-BDDA, boiling point: 230° C.), 1,6-hexanediol diacetate (1,6-HDDA, boiling point: 260° C.), and 2-ethyl-1,6-hexanediol diacetate. The above-mentioned glycol ester-based solvents may be used singly or in combination of two or more of them. These solvents have higher polarity than an aliphatic hydrocarbon solvent such as tetradecane, or n-decanol that is a high-boiling-point alcohol (bp: 236° C. (764 mmHg)), and are therefore excellent in the efficiency of washing silver nano-particles. Further, as compared to, for example, alcohols having the same number of carbon atoms as these solvents, these solvents have a higher boiling point and are therefore less likely to evaporate.

Among the above washing solvents, high-boiling-point solvents having a boiling point of 200° C. or higher are preferably used because these solvents have lower volatility, and therefore the concentration of the silver coating composition (silver ink, silver paste) is less likely to change. Also from the viewpoint of working environment, these solvents are preferred.

The operation for decantation and washing can be appropriately determined by those skilled in the art. For example, the silver nano-particles obtained in a suspended state may be washed with the washing solvent and spun down by centrifugation to remove a supernatant so that silver nano-particles wetted with the solvent are obtained. The amount the residual washing solvent contained in the wet silver nano-particles may be, for example, about 5% by weight to 15% by weight with respect to the weight of the wet silver nano-particles. That is, the amount of the silver nano-particles contained in the wet silver nano-particles may be about 85% by weight to 95% by weight. Such wet silver nano-particles are suitable for use in preparing a silver coating composition.

The step of forming the silver nano-particles according to the present invention does not require the use of a reducing agent. Therefore, a by-product derived from a reducing agent is not formed, coated silver nano-particles are easily separated from a reaction system, and high-purity coated silver nano-particles are obtained. However, if necessary, an appropriate reducing agent may be used without impairing the effects of the present invention.

In this way, silver nano-particles wetted with the washing solvent and whose surfaces are coated with a protective agent are formed. The protective agent comprises, for example, the aliphatic monoamine (A), and further one or both of the aliphatic monoamine (B) and the aliphatic diamine (C), and further if used, the carboxylic acid (D). The ratio among/between them contained in the protective agent is the same as the ratio among/between them used in the amine mixture liquid. The same matter is true in the metal nano-particles.

[Silver Microparticles (M)]

The silver particle coating composition according to the present invention may contain silver microparticles (M) in addition to the silver nano-particles (N) depending on its intended use such as intaglio offset printing. In this description, the term "microparticles" means that their average particle diameter is 1 μm or more and 10 μm or less. Unlike the above-mentioned silver nano-particles (N), the silver microparticles (M) have no aliphatic hydrocarbon amine protective agent on their surfaces. In the present invention, the silver microparticles may be spherical particles or flaky particles. The flaky particles refer to particles having an aspect ratio, which is the ratio of the diameter to the thickness of the microparticles (diameter/thickness), of, for example, 2 or more. The flaky particles have a larger area of contact among them than spherical particles, so that conductivity tends to be improved. Further, the silver microparticles (M) have an average particle diameter at 50% of cumulative particle size distribution D50 of, for example, 1 μm to 5 μm, preferably 1 μm to 3 μm. When the silver coating composition is used for gravure offset printing, the particles are preferably small from the viewpoint of drawing fine lines (e.g., L/S=30/30 μm). Examples of the silver microparticles include Silbest TC-507A (shape: flaky, D50: 2.78 μm), Silbest TC-505C (shape: flaky, D50: 2.18 μm), Silbest TC-905C (shape: flaky, D50: 1.21 μm), Silbest AgS-050 (shape: spherical, D50: 1.4 μm), and Silbest C-34 (shape: spherical, D50: 0.6 μm) manufactured by TOKURIKI HONTEN CO., LTD.; AG-2-1C (shape: spherical, 0.9 μm, manufactured by DOWA Electronics Materials Co., Ltd.); and the like. The particle diameter is calculated by laser diffractometry.

[Mixing Ratio Between Silver Nano-Particles (N) and Silver Microparticles (M)]

In the present invention, when the silver microparticles (M) are used, the mixing ratio between the silver nano-particles (N) and the silver microparticles (M) is not particularly limited. However, for example,
the amount of the silver nano-particles (N) may be 10 to 90% by weight; and
the amount of the silver microparticles (M) may be 10 to 90% by weight,
on the basis of the total amount of the silver nano-particles (N) and the silver microparticles (M). Such a mixing ratio makes it easy to obtain the effect of the silver nano-particles (N) on improving conductivity by low-temperature calcining, and the effect of the silver microparticles (M) on improving stability of the silver coating composition.

If the amount of the silver nano-particles (N) is less than 10% by weight, the amount of the silver nano-particles (N) filling gaps among the silver microparticles (M) is small, and therefore it is difficult to obtain the effect of improving contact among the silver microparticles (M). Further, the effect of the silver nano-particles (N), whose surfaces are coated with a protective agent containing an aliphatic hydrocarbon amine, obtained by low-temperature calcining becomes relatively small. For these reasons, it is difficult to obtain the conductivity-improving effect by low-temperature calcining. On the other hand, if the amount of the silver nano-particles (N) exceeds 90% by weight, there is a case where the storage stability of the silver coating composition is reduced. The silver nano-particles (N) used in the present invention are particles whose surfaces are coated with a protective agent containing an aliphatic hydrocarbon amine, and are suitable for low-temperature calcining. However, there is a case where the silver nano-particles (N) are gradually sintered even during the storage of the coating composition. Such sintering causes an increase in viscosity of the coating composition. From such a viewpoint, the silver microparticles (M), which are stable even at about ordinary temperature, are preferably used in an amount of 10% by weight or more.

Preferably,
the amount of the silver nano-particles (N) may be 30 to 80% by weight; and
the amount of the silver microparticles (M) may be 20 to 70% by weight, and more preferably,
the amount of the silver nano-particles (N) may be 50 to 75% by weight; and
the amount of the silver microparticles (M) may be 25 to 50% by weight.

[Binder Resin]

In the present invention, the silver coating composition may further comprise a binder resin. The binder resin is not particularly limited, and examples thereof include a vinyl chloride-vinyl acetate copolymer resin, a polyvinyl butyral resin, a polyester-based resin, an acrylic resin, and an ethyl cellulose-based resin. When the silver coating composition comprises a binder resin, a calcined silver film (conductive pattern) obtained by calcining the silver coating composition applied (or printed) onto a substrate on which the silver coating composition should be printed has improved adhesion to the substrate and improved flexibility. Further, the viscosity of the coating composition can be adjusted by the binder resin, and therefore the silver particle coating composition can have a viscosity suitable for various printing methods such as intaglio offset printing and screen printing.

Depending on the type of printing method, the amount of the binder to be added is, for example, about 0.1% by weight or more and 10% by weight or less, preferably about 2% by weight or more and 5% by weight or less with respect to the amount of the silver coating composition. When the amount of the binder resin to be added is within the above range, the silver particle coating composition can easily have a viscosity suitable for intaglio offset printing or screen printing, and the calcined silver film can easily have improved adhesion to a substrate and improved flexibility.

[Additive]

In the present invention, the silver coating composition may further contain an additive such as a surface energy modifier. The surface energy modifier has the function of reducing the surface tension of the silver particle coating composition so that evaporation of the solvent from the surface of the composition is suppressed.

The surface energy modifier is not particularly limited, and examples thereof include a silicon-based surface energy modifier, an acrylic surface energy modifier, and the like.

The amount of the surface energy modifier to be added is, for example, about 0.01% by weight or more and 10% by weight or less, preferably about 0.1% by weight or more and 10% by weight or less, more preferably about 0.5% by weight or more and 5% by weight or less with respect to the amount of the silver coating composition. When the amount of the surface energy modifier to be added is within the above range, the evaporation of the solvent from the surface of the composition is easily suppressed. If the amount of the surface energy modifier to be added is less than 0.01% by weight, the effect of suppressing solvent evaporation is poorly obtained. On the other hand, if the amount of the surface energy modifier to be added exceeds 10% by weight, adhesion between a transferred silver coating composition layer and a substrate tends to be reduced. Further, the surface energy modifier remains as an extra residual resin after sintering, which may cause a problem that conductive lines are poor in conductivity.

[Dispersion Solvent]

The dispersion solvent may be a low-volatile solvent capable of well dispersing the silver nano-particles (N) and, if used, the silver microparticles (M), and dissolving the binder resin. When the dispersion solvent has low volatility, the silver coating composition (silver ink, silver paste) is obtained whose concentration is less likely to change.

Examples of such a dispersion solvent include a glycol ether-based solvent and a glycol ester-based solvent (glycol monoester-based solvent, glycol diester-based solvent) that have been mentioned above as washing solvents. The above-mentioned glycol ether-based solvents may be used singly or in combination of two or more of them. The above-mentioned glycol ester-based solvents may be used singly or in combination of two or more of them. These dispersion solvents are excellent in the efficiency of dispersing the silver nano-particles.

The glycol ether-based solvent or the glycol ester-based solvent has the property of penetrating into a blanket made of silicone in intaglio offset printing. The penetration of the solvent into the blanket dries the interface between the blanket and the ink, which reduces adhesion between the ink and the blanket. This is effective at improving transferability of the ink from the blanket to a substrate. Also from this point of view, the glycol ether-based solvent or the glycol ester-based solvent is preferred.

As in the case of the washing solvent, among the glycol ether-based solvent and the glycol ester-based solvent, high-boiling-point solvents having a boiling point of 200° C. or higher are preferably used because these solvents have lower volatility, and therefore the concentration of the silver coating composition (silver ink, silver paste) is less likely to change. Also from the viewpoint of working environment, these solvents are preferred. However, a solvent having a boiling point of lower than 200° C. may be used as a solvent to be added during dispersion.

As the dispersion solvent, other organic solvents other than the glycol ether-based solvent and the glycol ester-based solvent may be used. Examples of the other organic solvents used to obtain the silver coating composition include aliphatic hydrocarbon solvents such as pentane, hexane, heptane, octane, nonane, decane, undecane, dodecane, tridecane, and tetradecane; alicyclic hydrocarbon solvents such as cyclohexane and methylcyclohexane; aromatic hydrocarbon solvents such as toluene, xylene, and mesitylene; alcohol solvents such as n-pentanol (bp: 137.5° C.), n-hexanol (bp: 157.5° C.), n-heptanol (bp: 176.8° C.), n-octanol (bp: 195.3° C.), n-nonanol (bp: 213.5° C.), and n-decanol (bp: 236° C. (764 mmHg)); and terpene-based solvents such as terpineol (bp: 218° C.) and dihydroterpineol (bp: 208° C.).

Among these other organic solvents mentioned above, high-boiling-point solvents having a boiling point of 200° C. or higher are preferably used because these solvents have low volatility, and therefore the concentration of the silver coating composition (silver ink, silver paste) is less likely to change. Also from the viewpoint of working environment, these solvents are preferred. However, a solvent having a boiling point of lower than 200° C. may be used as a solvent to be added during dispersion.

The kind and amount of dispersion solvent used may be appropriately determined depending on a desired concentration or viscosity of the silver coating composition (silver ink, silver paste). The same matter is true in the metal nano-particles.

In the present invention, the dispersion solvent comprises the residual washing solvent that has been contained in the wet silver nano-particles, and the dispersion solvent that has been added to prepare the silver coating composition. The total amount of the dispersion solvent (i.e., the total of the amount of the residual washing solvent that has been contained in the wet silver nano-particles, and the amount of the dispersion solvent that has been added to prepare the silver coating composition) is, for example, 10% by weight or more and 60% by weight or less, preferably 15% by weight or more and 50% by weight or less, more preferably 18% by weight or more and 40% by weight or less with respect to the amount of the silver coating composition. From the viewpoint of using the silver coating composition for intaglio offset printing, if the amount of the dispersion solvent is less than 10% by weight, the amount of the solvent is small, and therefore there is a possibility that transfer during printing is not successfully performed. On the other hand, if the amount of the dispersion solvent exceeds 60% by weight, the amount of the solvent is large, and therefore there is a possibility that printing of fine lines is not successfully performed, or there is a possibility that low-temperature calcining is not successfully performed. Also in screen printing or another printing method, the amount of the dispersion solvent may be appropriately determined so as to be almost within the above range.

In the present invention, the silver coating composition may further comprise a component other than the above components so that the object of the present invention can be achieved.

In consideration of using the silver coating composition for intaglio offset printing, the viscosity of the silver coating composition (silver ink) is, for example, in the range of 0.1 Pa·s or more and 30 Pa·s or less, preferably in the range of 5 Pa·s or more and 25 Pa·s or less at ambient temperature condition (e.g., 25° C.) during printing. If the viscosity of the ink is less than 0.1 Pa·s, flowability of the ink is too high, and therefore there is a fear that a problem occurs with reception of the ink from an intaglio plate by a blanket, or with transfer of the ink from a blanket to a substrate on which the ink should be printed. On the other hand, if the viscosity of the ink exceeds 30 Pa·s, flowability of the ink is too low, and therefore there is a fear that recesses of an intaglio plate are poorly filled with the ink. If the recesses are poorly filled with the ink, the accuracy of a pattern transferred onto a substrate is reduced so that a problem occurs such as fine line disconnection. Also in screen printing or another printing method, the viscosity may be appropriately determined so as to be almost within the above range.

The coated silver nano-particles (N) in a wet state obtained in the silver nano-particle post-treatment washing step, and if used, the powder of silver microparticles (M), the binder resin, and the dispersion solvent are mixed together with stirring so that ink (or paste) containing suspended silver particles can be prepared. The amount of the silver particles depends on the intended use, but may be, for example, 10% by weight or more, or 25% by weight or more, preferably 30% by weight or more as the total amount of the silver nano-particles (N) and the silver microparticles (M) contained in the silver particle-containing ink. The upper limit of the content of the silver particles is 80% by weight or less as a standard. The mixing and dispersing of the coated silver nano-particles (N) and the silver microparticles (M); the binder resin; and the dispersion solvent may be performed at one time or several times.

The silver coating composition obtained in the present invention has excellent stability. The silver ink is stable at a silver concentration of, for example, 50% by weight during cold storage at 5° C. for 1 month or more without causing viscosity increase.

The prepared silver coating composition is applied onto a substrate by a known coating method, for example, by an intaglio offset printing method or a screen printing method, and is then calcined.

A patterned silver ink coating layer is obtained by intaglio offset printing or screen printing and calcined to obtain a patterned silver conductive layer (calcined silver film).

The silver particle coating composition according to the present invention contains, as at least part of the dispersion solvent, a glycol ether-based solvent and/or a glycol ester-based solvent derived from the washing solvent. As compared to, for example, alcohols having the same number of carbon atoms as these solvents, these solvents have a higher boiling point and are therefore less likely to evaporate. Therefore, a temporal change in the composition of the silver ink is suppressed so that the quality of the silver ink is maintained constant. Even when a solvent derived from the washing solvent is only part of the entire dispersion solvent (e.g., 5 to 60% by weight, preferably 10 to 50% by weight, particularly 15 to 45% by weight), as shown in Examples, a temporal change in the composition of the silver ink is suppressed, and this makes it possible to obtain the effect of improving printing performance. Accordingly, the silver particle coating composition of the present invention is excellent in printability even when continuous printing is performed by any printing method.

The calcining can be performed at 200° C. or less, for example, a room temperature (25° C.) or more and 150° C. or less, preferably a room temperature (25° C.) or more and 120° C. or less. However, in order to complete the sintering of silver by short-time calcining, the calcining may be performed at a temperature of 60° C. or more and 200° C. or less, for example, 80° C. or more and 150° C. or less, preferably 90° C. or more and 120° C. or less. The time of calcining may be appropriately determined in consideration of the amount of the silver ink applied, the calcining temperature, etc., and may be, for example, several hours (e.g., 3 hours, or 2 hours) or less, preferably 1 hour or less, more preferably 30 minutes or less, even more preferably 10 minutes to 30 minutes.

The silver nano-particles have such a constitution as described above, and are therefore sufficiently sintered even by such low-temperature and short-time calcining. As a result, excellent conductivity (low resistance value) is developed. A silver conductive layer having a low resistance value (e.g., 15 $\mu\Omega$cm or less, in the range of 5 to 15 $\mu\Omega$cm) is formed. The resistance value of bulk silver is 1.6 $\mu\Omega$cm.

Since the calcining can be performed at a low temperature, not only a glass substrate or a heat-resistant plastic substrate such as a polyimide-based film but also a general-purpose plastic substrate having low heat resistance, such as a polyester-based film, e.g., a polyethylene terephthalate (PET) film or a polyethylene naphthalate (PEN) film, or a polyolefin-based film, e.g., a polypropylene film, can be suitably used as a substrate. Further, short-time calcining reduces the load on such a general-purpose plastic substrate having low heat resistance, and improves production efficiency.

A silver conductive material obtained according to the present invention can be applied to various electronic devices such as electromagnetic wave control materials, circuit boards, antennas, radiator plates, liquid crystal displays, organic EL displays, field emission displays (FEDs), IC cards, IC tags, solar cells, LED devices, organic transistors, condensers (capacitors), electronic paper, flexible batteries, flexible sensors, membrane switches, touch panels, and EMI shields. Particularly, the silver conductive material is effective as an electronic material required to have surface smoothness, such as a gate electrode of a thin film transistor (TFT) in a liquid crystal display.

The thickness of the silver conductive layer may be appropriately determined depending on the intended use. The thickness of the silver conductive layer is not particularly limited, and may be selected from the range of, for example, 5 nm to 20 $\mu$m, preferably 100 nm to 10 $\mu$m, more preferably 300 nm to 8 $\mu$m. Depending on the intended use, the thickness of the silver conductive layer may be, for example, 1 $\mu$m to 5 $\mu$m, preferably 1 $\mu$m to 3 $\mu$m or 1 $\mu$m to 2 $\mu$m.

The present invention has been described above with reference mainly to ink containing silver nano-particles, but is applied also to ink containing metal nano-particles containing a metal other than silver.

EXAMPLES

Hereinbelow, the present invention will be described more specifically with reference to examples, but is not limited to these examples.

[Specific Resistance Value of Calcined Silver Film]

The specific resistance value of an obtained calcined silver film was measured by a four-terminal method (Loresta GP MCP-T610). The measuring limit of this device is $10^7$ $\Omega$cm.

Reagents used in Examples and Comparative Example are as follows:

n-Butylamine (MW: 73.14): reagent manufactured by Tokyo Chemical Industry Co., Ltd.;
2-Ethylhexylamine (MW: 129.25): reagent manufactured by Wako Pure Chemical Industries, Ltd.;
n-Octylamine (MW: 129.25): reagent manufactured by Tokyo Chemical Industry Co., Ltd.;
Methanol: special grade reagent manufactured by Wako Pure Chemical Industries, Ltd.;
1-Butanol: special grade reagent manufactured by Wako Pure Chemical Industries, Ltd.;
Silver oxalate (MW: 303.78): synthesized from silver nitrate (manufactured by Wako Pure Chemical Industries, Ltd.) and oxalic acid dihydrate (manufactured by Wako Pure Chemical Industries, Ltd.).

Example 1

(Preparation of Silver Nano-Particles)

In a 500-mL flask, 40.0 g (0.1317 mol) of silver oxalate was charged, and then 60 g of n-butanol was added thereto to prepare a n-butanol slurry of silver oxalate. An amine mixture liquid of 115.58 g (1.5802 mol) of n-butylamine, 51.06 g (0.3950 mol) of 2-ethylhexylamine, and 17.02 g (0.1317 mol) of n-octylamine was dropped into this slurry at 30° C. After the dropping, the slurry was stirred at 30° C. for 1 hour to allow a complex forming reaction between silver oxalate and the amines to proceed. After a silver oxalate-amine complex was formed, the silver oxalate-amine complex was thermally decomposed by heating at 110° C. to obtain a suspension in which deep blue silver nano-particles were suspended in the amine mixture liquid.

(Washing of Silver Nano-Particles)

The obtained suspension was cooled, and 120 g of methanol was added thereto with stirring, and then the silver nano-particles were spun down by centrifugation to remove a supernatant. Then, 120 g of butyl carbitol (diethylene glycol monobutyl ether manufactured by Tokyo Chemical Industry Co., Ltd.) was added to the silver nano-particles with stirring, and then the silver nano-particles were spun down by centrifugation to remove a supernatant. In this way, wet silver nano-particles containing butyl carbitol were obtained. As a result of thermobalance using TG/DTA6300 manufactured by SII, the amount of silver nano-particles occupying the wet silver nano-particles was 90 wt %. That is, the amount of butyl carbitol was 10 wt %.

Further, the wet silver nano-particles were observed by a standard method using a scanning electron microscope (JSM-6700F manufactured by JEOL Ltd.) to determine the average particle diameter of the silver nano-particles. As a result, the average particle diameter (primary particle diameter) of the silver nano-particles was about 50 nm.

The average particle diameter was determined in the following manner. The silver nano-particles were observed with SEM. The particle diameters of 10 of the silver particles arbitrarily selected on a SEM photograph were determined, and their average was regarded as the average particle diameter of the silver nano-particles.
(Preparation of Silver Ink)

First, 0.4 g of an ethyl cellulose resin (ETHOCEL™, std. 45 manufactured by Dow Chemical Company), 0.1 g of a liquid rheology control agent, BYK430 (manufactured by BYK Japan KK), and 3.96 g of dihydroterpineol (manufactured by Nippon Terpene Chemicals, Inc.) were added to a planetary centrifugal kneader (MAZERUSTAR KKK2508 manufactured by KURABO INDUSTRIES LTD) and kneaded with stirring for 20 minutes to prepare a liquid A.

Then, 7.77 g of the wet silver nano-particles containing 10 wt % of butyl carbitol was weighed, 2.23 g of the liquid A was added to these silver nano-particles, and the mixture was kneaded with stirring by a planetary centrifugal kneader (MAZERUSTAR KKK2508 manufactured by KURABO INDUSTRIES LTD.) for 30 seconds. Then, the mixture was stirred with a spatula for 1 minute. The mixture was further stirred by the kneader for 30 seconds and then stirred with a spatula for 1 minute, which was repeated twice. In this way, a blackish brown silver ink was obtained.

Table 1 shows the composition of the silver ink. In Table 1, the amount of each of the components is expressed in part (s) by weight per 100 parts by weight of the total amount of the silver ink. Butyl carbitol is a component contained in the "wet silver nano-particles". The silver concentration of the silver ink was 70 wt %.
(Printability of Silver Ink)

The silver ink was continuously printed on a PET film at 25° C. using a screen printing apparatus (LS-150TV manufactured by NEWLONG SEIMITSU KOGYO Co., Ltd) to evaluate printability. Continuous printing was performed ten times. As a result, printing was successfully performed.
(Calcining of Silver Ink: Conductivity Evaluation)

The silver ink was applied onto a soda glass plate to form a coating film. After being formed, the coating film was rapidly calcined in a fan drying oven at 120° C. for 30 minutes to form a calcined silver film having a thickness of 2 μm. The specific resistance value of the obtained calcined silver film was measured by a four-terminal method, and as a result, the calcined silver film exhibited excellent conductivity of 11 μΩcm. Thus, the silver ink exhibited excellent conductivity by low-temperature and short-time calcining.

Example 2

Silver nano-particles were prepared in the same manner as in Example 1 to obtain a suspension of the silver nano-particles.
(Washing of Silver Nano-Particles)

The obtained suspension was cooled, and 120 g of methanol was added thereto with stirring, and then the silver nano-particles were spun down by centrifugation to remove a supernatant. Then, 120 g of hexyl carbitol (diethylene glycol monohexyl ether manufactured by Tokyo Chemical Industry Co., Ltd.) was added to the silver nano-particles with stirring, and then the silver nano-particles were spun down by centrifugation to remove a supernatant. In this way, wet silver nano-particles containing hexyl carbitol were obtained. As a result of thermobalance using TG/DTA6300 manufactured by SII, the amount of silver nano-particles occupying the wet silver nano-particles was 90 wt %. That is, the amount of hexyl carbitol was 10 wt %.
(Preparation of Silver Ink)

Then, 7.77 g of the wet silver nano-particles containing 10 wt % of hexyl carbitol was weighed, and 2.23 g of the liquid A was added to these silver nano-particles to obtain a blackish brown silver ink in the same manner as in Example 1. The silver concentration of the silver ink was 70 wt %.
(Printability of Silver Ink)

The silver ink was continuously printed on a PET film in the same manner as in Example 1 using a screen printing apparatus (LS-150TV manufactured by NEWLONG SEIMITSU KOGYO Co., Ltd) to evaluate printability. Continuous printing was performed ten times. As a result, printing was successfully performed.
(Calcining of Silver Ink: Conductivity Evaluation)

A coating film was formed in the same manner as in Example 1, and was then calcined at 120° C. for 30 minutes to form a calcined silver film having a thickness of 2 μm. The specific resistance value of the obtained calcined silver film was measured by a four-terminal method, and as a result, the calcined silver film exhibited excellent conductivity of 14 μΩcm. Thus, the silver ink exhibited excellent conductivity by low-temperature and short-time calcining.

Comparative Example 1

Silver nano-particles were prepared in the same manner as in Example 1 to obtain a suspension of the silver nano-particles.
(Washing of Silver Nano-Particles)

The obtained suspension was cooled, and 120 g of methanol was added thereto with stirring, and then the silver nano-particles were spun down by centrifugation to remove a supernatant. Then, 120 g of methanol was added to the silver nano-particles with stirring, and the silver nano-particles were then spun down by centrifugation to remove a supernatant. In this way, wet silver nano-particles containing methanol were obtained. As a result of thermobalance using TG/DTA6300 manufactured by SII, the amount of silver nano-particles occupying the wet silver nano-particles was 90 wt %. That is, the amount of methanol was 10 wt %.
(Preparation of Silver Ink)

Then, 7.77 g of the wet silver nano-particles containing 10 wt % of methanol was weighed, and 2.23 g of the liquid A was added to these silver nano-particles to obtain a blackish brown silver ink in the same manner as in Example 1. The silver concentration of the silver ink was 70 wt %.
(Printability of Silver Ink)

The silver ink was continuously printed on a PET film in the same manner as in Example 1 using a screen printing apparatus (LS-150TV manufactured by NEWLONG SEIMITSU KOGYO Co., Ltd) to evaluate printability. When continuous printing was performed ten times, the ink was dried and solidified on a screen printing plate, and printing failure, such as defective printed lines or deterioration in line shape, was observed.
(Calcining of Silver Ink: Conductivity Evaluation)

A coating film was formed in the same manner as in Example 1, and was then calcined at 120° C. for 30 minutes to form a calcined silver film having a thickness of 2 μm. The specific resistance value of the obtained calcined silver film was measured by a four-terminal method, and as a result, the calcined silver film exhibited excellent conductivity of 10 μΩcm. Thus, the silver ink exhibited excellent conductivity by low-temperature and short-time calcining.

Comparative Example 2

Silver nano-particles were prepared in the same manner as in Example 1 to obtain a suspension of the silver nano-particles.

(Washing of Silver Nano-Particles)

The obtained suspension was cooled, and 120 g of methanol was added thereto with stirring, and then the silver nano-particles were spun down by centrifugation to remove a supernatant. Then, 120 g of n-butanol was added to the silver nano-particles with stirring, and the silver nano-particles were then spun down by centrifugation to remove a supernatant. In this way, wet silver nano-particles containing n-butanol were obtained. As a result of thermobalance using TG/DTA6300 manufactured by SII, the amount of silver nano-particles occupying the wet silver nano-particles was 90 wt %. That is, the amount of n-butanol was 10 wt %.

(Preparation of Silver Ink)

Then, 7.77 g of the wet silver nano-particles containing 10 wt % of n-butanol was weighed, and 2.23 g of the liquid A was added to these silver nano-particles to obtain a blackish brown silver ink in the same manner as in Example 1. The silver concentration of the silver ink was 70 wt %.

(Printability of Silver Ink)

The silver ink was continuously printed on a PET film in the same manner as in Example 1 using a screen printing apparatus (LS-150TV manufactured by NEWLONG SEIMITSU KOGYO Co., Ltd) to evaluate printability. When continuous printing was performed ten times, the ink was dried and solidified on a screen printing plate, and printing failure, such as defective printed lines or deterioration in line shape, was observed.

(Calcining of Silver Ink: Conductivity Evaluation)

A coating film was formed in the same manner as in Example 1, and was then calcined at 120° C. for 30 minutes to form a calcined silver film having a thickness of 2 μm. The specific resistance value of the obtained calcined silver film was measured by a four-terminal method, and as a result, the calcined silver film exhibited excellent conductivity of 10 μΩcm. Thus, the silver ink exhibited excellent conductivity by low-temperature and short-time calcining.

Table 1 shows the above results.

TABLE 1

| | Names of Items | Example 1 | Example 2 | Comparative Example 1 | Comparative Example 2 |
|---|---|---|---|---|---|
| Composition (parts by weight) | Silver nano-particles | 70 | 70 | 70 | 70 |
| | Ethyl cellulose std.45 | 2 | 2 | 2 | 2 |
| | Rheology control agent BYK430 | 0.5 | 0.5 | 0.5 | 0.5 |
| | Butyl carbitol (Washing solvent for silver nano-particles) | 7.7 | — | — | — |
| | Hexyl carbitol (Washing solvent for silver nano-particles) | — | 7.7 | — | — |
| | Methanol (Washing solvent for silver nano-particles) | — | — | 7.7 | — |
| | Butanol (Washing solvent for silver nano-particles) | — | — | — | 7.7 |
| | Dihydroterpineol DHTP | | | | |
| | Total | 100 | 100 | 100 | 100 |
| Characteristics | Specific resistance (μΩ · cm) 120° C., 30 min | 11 | 14 | 10 | 10 |
| | Screen printability (continuous printing 10 times) | Excellent | Excellent | Poor | Poor |

The above examples have been described with reference to a case where the silver ink was printed by screen printing, but the silver particle coating composition according to the present invention exhibits excellent printability also in intaglio offset printing, such as gravure offset printing or curved surface printing, or another printing method.

The invention claimed is:

1. A silver particle coating composition comprising:
   silver nano-particles whose surfaces are coated with a protective agent comprising an aliphatic hydrocarbon amine; and
   a dispersion solvent in an amount of 10% by weight or more and 60% by weight or less with respect to an amount of the silver particle coating composition,
   wherein the dispersion solvent comprises 10 to 50% by weight of a solvent selected from the group consisting of a glycol ether-based solvent and a glycol ester-based solvent, and 50 to 90% by weight of a terpene-based solvent, and
   wherein the aliphatic hydrocarbon amine in the silver nano-particle comprises an aliphatic hydrocarbon monoamine (A) comprising an aliphatic hydrocarbon group and one amino group, said aliphatic hydrocarbon group having 6 or more carbon atoms in total, and
   further comprises at least one of: an aliphatic hydrocarbon monoamine (B) comprising an aliphatic hydrocarbon group and one amino group, said aliphatic hydrocarbon group having 5 or less carbon atoms in total; and an aliphatic hydrocarbon diamine (C) comprising an aliphatic hydrocarbon group and two amino groups, said aliphatic hydrocarbon group having 8 or less carbon atoms in total.

2. The silver particle coating composition according to claim 1, wherein the aliphatic hydrocarbon monoamine (A) is at least one selected from the group consisting of a linear alkylmonoamine having a linear alkyl group having 6 or more and 12 or less carbon atoms, and a branched alkylmonoamine having a branched alkyl group having 6 or more and 16 or less carbon atoms.

3. The silver particle coating composition according to claim 1, wherein the aliphatic hydrocarbon monoamine (B) is an alkylmonoamine having 2 or more and 5 or less carbon atoms.

4. The silver particle coating composition according to claim 1, wherein the aliphatic hydrocarbon diamine (C) is an alkylenediamine in which one of the two amino groups is a primary amino group, and the other is a tertiary amino group.

5. The silver particle coating composition according to claim 1, wherein the aliphatic hydrocarbon amine is used in a total amount of 1 to 50 moles per 1 mole of silver atoms in the silver nano-particles.

6. The silver particle coating composition according to claim 1, which is used for screen printing or intaglio offset printing.

7. An electronic device comprising:
   a substrate; and
   a silver conductive layer obtained by applying, onto the substrate, the silver particle coating composition according to claim 1 and calcining the silver particle coating composition.

8. The silver particle coating composition according to claim 1, further comprising silver microparticles.

9. The silver particle coating composition according to claim 1, wherein the dispersion solvent comprises 15 to 45% by weight of the solvent selected from the group consisting of a glycol ether-based solvent and a glycol ester-based solvent, and 55 to 85% by weight of the terpene-based solvent.

* * * * *